(12) United States Patent
Li

(10) Patent No.: US 10,540,534 B2
(45) Date of Patent: Jan. 21, 2020

(54) ELECTRODE STRUCTURE, FINGERPRINT RECOGNITION MODULE AND MANUFACTURING METHOD THEREOF, DISPLAY DEVICE

(71) Applicant: BOE TECHNOLOGY GROUP CO., LTD., Beijing (CN)

(72) Inventor: Yingyi Li, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 324 days.

(21) Appl. No.: 15/524,074

(22) PCT Filed: Oct. 24, 2016

(86) PCT No.: PCT/CN2016/103107
§ 371 (c)(1),
(2) Date: May 3, 2017

(87) PCT Pub. No.: WO2017/071544
PCT Pub. Date: May 4, 2017

(65) Prior Publication Data
US 2017/0316245 A1 Nov. 2, 2017

(30) Foreign Application Priority Data

Oct. 29, 2015 (CN) .......................... 2015 1 0719692

(51) Int. Cl.
*G06K 9/00* (2006.01)
*C09J 9/02* (2006.01)
(Continued)

(52) U.S. Cl.
CPC .............. *G06K 9/0002* (2013.01); *C09J 9/02* (2013.01); *C09J 11/04* (2013.01); *H01B 1/18* (2013.01); *H01B 1/24* (2013.01); *H01B 13/0036* (2013.01)

(58) Field of Classification Search
CPC .. G06K 9/0002; G06K 9/00; C09J 9/02; C09J 11/04; H01B 1/18; H01B 1/24; H01B 13/0036
See application file for complete search history.

(56) References Cited

U.S. PATENT DOCUMENTS 5,371,404 A * 12/1994 Juskey .................... H01L 23/04
257/659
6,525,547 B2 * 2/2003 Hayes .................. G01D 5/2405
324/662
(Continued)

FOREIGN PATENT DOCUMENTS

CN 102645989 A 8/2012
CN 103682078 A 3/2014
(Continued)

OTHER PUBLICATIONS

First Chinese Office Action dated Jan. 19, 2018.
International Search Report dated Feb. 7, 2017.
Chinese Office Action dated Aug. 20, 2018.

*Primary Examiner* — Manav Seth
(74) *Attorney, Agent, or Firm* — Dilworth & Barrese, LLP.; Michael J. Musella, Esq.

(57) ABSTRACT

Disclosed is an electrode structure including an electrode body, a composite layer disposed on the electrode body; a surface of the composite layer away from the electrode body being set to be a finger contact surface in a case of fingerprint recognition, wherein the composite layer is made from composite materials formed by a cured main body glue and one-dimensional nano-conductor materials distributed in the main body glue; and an end of each of the one-dimensional nano-conductor materials exposed from the finger contact surface of the composite layer, and the other of each of the one-dimensional nano-conductor materials makes contact with the electrode body. A fingerprint recognition module including the electrode structure and a manufacturing method thereof are also disclosed.

16 Claims, 2 Drawing Sheets

(51) Int. Cl.
*C09J 11/04* (2006.01)
*H01B 1/18* (2006.01)
*H01B 1/24* (2006.01)
*H01B 13/00* (2006.01)

(56) References Cited

U.S. PATENT DOCUMENTS

| | | | | |
|---|---|---|---|---|
| 6,714,666 | B1* | 3/2004 | Morimura | G06K 9/0002 |
| | | | | 340/5.52 |
| 6,785,407 | B1* | 8/2004 | Tschudi | G06K 9/0002 |
| | | | | 382/124 |
| 7,251,351 | B2* | 7/2007 | Mathiassen | G06K 9/0002 |
| | | | | 382/124 |
| 7,738,681 | B1* | 6/2010 | Rannow | G06K 9/0002 |
| | | | | 382/124 |
| 8,445,122 | B2* | 5/2013 | Deguet | B82Y 10/00 |
| | | | | 257/E21.002 |
| 8,860,683 | B2* | 10/2014 | Baumbach | G06F 3/03547 |
| | | | | 345/174 |
| 9,177,191 | B2* | 11/2015 | Benkley, III | G06K 9/00053 |
| 9,245,167 | B2* | 1/2016 | Carver | G06K 9/0004 |
| 9,952,367 | B2* | 4/2018 | Li | B29D 11/00644 |
| 10,095,906 | B2* | 10/2018 | Benkley, III | G06K 9/0002 |
| 2006/0056663 | A1* | 3/2006 | Call | B60R 25/25 |
| | | | | 382/115 |
| 2011/0019373 | A1* | 1/2011 | Ryhanen | G01D 5/2405 |
| | | | | 361/760 |
| 2015/0036065 | A1* | 2/2015 | Yousefpor | G06K 9/228 |
| | | | | 349/12 |
| 2015/0242672 | A1 | 8/2015 | Benkley, III et al. | |
| 2016/0306459 | A1* | 10/2016 | Yang | G06F 3/044 |

FOREIGN PATENT DOCUMENTS

| | | |
|---|---|---|
| CN | 104091154 A | 10/2014 |
| CN | 104766053 A | 7/2015 |
| CN | 105184287 A | 12/2015 |
| WO | 2014084112 A1 | 6/2014 |

* cited by examiner

ELECTRODE STRUCTURE, FINGERPRINT RECOGNITION MODULE AND MANUFACTURING METHOD THEREOF, DISPLAY DEVICE

TECHNICAL FIELD

Embodiments of the present disclosure relate to an electrode structure, a fingerprint recognition module and a manufacturing method thereof, and a display device.

BACKGROUND

A fingerprint is the pattern of protrusions (namely ridges) and depressions (valleys) arranged linearly on an epidermal layer of a finger. As fingerprint has the characteristics of lifelong invariance, uniqueness and portability, fingerprint has become a synonym for biometric recognition and is widely applied in the field of authentication and identification of identity information such as security facilities and attendance systems.

Fingerprint recognition mainly adopts capacitive sensing technology. The principle of fingerprint recognition is that: when a finger touches capacitive electrodes arranged in an array in a fingerprint recognition module, protruded ridges make direct contact with the capacitive electrodes, and depressed valleys are far away from the capacitive electrodes, so that different sensing capacitance can be produced; fingerprint information of a contact person will be obtained by converting sensing capacitance into 2D image data; and hence the subsequent fingerprint comparison operation can be executed.

The capacitive electrodes are mainly made from conductive materials such as indium tin oxide (ITO). As limited by the accuracy of a mask and an etching process in the patterning process, the capacitive electrodes cannot be further manufactured to be finer nanometer size, so that the accuracy and the sensitivity of the capacitive fingerprint recognition mode can be limited.

SUMMARY

At least one embodiment of the disclosure provides an electrode structure for fingerprint recognition, comprising: an electrode body, and a composite layer disposed on the electrode body; a surface of the composite layer away from the electrode body being set to be a finger contact surface in a case of fingerprint recognition, wherein the composite layer is made from composite materials formed by a cured main body glue and one-dimensional nano-conductor materials distributed in the main body glue; and an end of each of the one-dimensional nano-conductor materials is exposed from the finger contact surface of the composite layer, and the other of each of the one-dimensional nano-conductor materials makes contact with the electrode body.

In one embodiment of the disclosure, the one-dimensional nano-conductor materials have a structure including at least one of nano wire, nanobelt, nanotube, or nanorod.

In one embodiment of the disclosure, the one-dimensional nano-conductor materials include any one of carbon, elemental metal, or alloy; metallic elements for forming the elemental metal element include: any one selected from the group consisted of gold, silver, copper, cobalt, nickel, zinc, iron, platinum, ruthenium, niobium, iridium, palladium, titanium, cadmium, tungsten, vanadium, and bismuth; and metallic elements in the alloy include: at least one selected from gold, silver, copper, cobalt, nickel, zinc, iron, platinum, ruthenium, molybdenum, niobium, iridium, palladium, titanium, cadmium, tungsten, vanadium, and bismuth.

In one embodiment of the disclosure, the one-dimensional nano-conductor materials are carbon nanotubes.

In one embodiment of the disclosure, the main body glue is ultraviolet (UV) curing adhesive or heat curing adhesive.

In one embodiment of the disclosure, the electrode body is made from any material of transparent conductive material, metal, or alloy.

In one embodiment of the disclosure, the axial direction of each of the one-dimensional nano-conductor materials is at an angle with an upper surface of the electrode body, and the angle is ranged from 70° to 90°.

In one embodiment of the disclosure, the one-dimensional nano-conductor materials are arranged in parallel.

In one embodiment of the disclosure, a thickness of the composite layer is ranged from 20 µm to 200 µm.

At least one embodiment of the disclosure provides a fingerprint recognition module, comprising the electrode structure as mentioned above.

In one embodiment of the disclosure, the electrode bodies of a plurality of electrode structures are arranged with interval, and the composite layers of the plurality of electrode structures have an integrated structure.

At least one embodiment of the disclosure provides method for manufacturing a fingerprint recognition module, the method comprises forming electrode structures, and forming the electrode structures includes: forming a conductive film on a substrate layer; forming a composite film for covering the conductive film, in which the composite film is made from composite materials formed by a main body glue and one-dimensional nano-conductor materials distributed in the main body glue; the one-dimensional nano-conductor materials are arranged in parallel; one end of each of the one-dimensional nano-conductor materials is exposed on a finger contact surface of the main body glue, and the other end of each of the one-dimensional nano-conductor materials makes contact with the conductive film; curing the main body glue; and performing patterning process on the conductive film and the composite film, forming a plurality of spaced electrode bodies and composite layers disposed on upper surfaces of the electrode bodies, and the electrode structures being formed by the electrode bodies and the composite layers.

At least one embodiment of the disclosure provides a method for manufacturing a fingerprint recognition module comprising forming electrode structures, and forming the electrode structures comprise: forming a conductive film on a substrate layer; performing patterning process on the conductive film, and forming a plurality of spaced electrode bodies; forming a composite film for covering the substrate and the electrode bodies, in which the composite film is made from composite materials formed by main body glue and one-dimensional nano-conductor materials distributed in the main body glue; the one-dimensional nano-conductor materials are arranged in parallel; one end of each of the one-dimensional nano-conductor materials is exposed on a finger contact surface of the main body glue, and the other end of each of the one-dimensional nano-conductor materials makes contact with the conductive film; and curing the main body glue, and forming the plurality of electrode structures, in which the plurality of electrode structures are formed by the plurality of spaced electrode bodies and composite layers disposed on upper surfaces of the electrode bodies, and the composite layers of the plurality of electrode structures are an integrated structure.

At least one embodiment of the disclosure provides a display device, comprising the fingerprint recognition module as mentioned above.

By adoption of the electrode structure provided by the embodiment of the present disclosure, as one end of an one-dimensional nano-conductor material makes contact with an electrode body and the other end is exposed by main body glue, when a certain amount of electricity is introduced into the electrode body, the one-dimensional nano-conductor materials and the electrode body are electrically connected. As the one-dimensional nano-conductor materials are parallel to each other, each one-dimensional nano-conductor material distributed on an upper surface of the electrode body is equivalent to one conductive fluff and may accurately make contact with a ridge and valley structure on a surface of a finger. As the radial dimension of the one-dimensional nano-conductor material making contact with the ridges and the valleys is far less than the dimension of the capacitive electrode such as ITO, the embodiment obviously improves the accuracy and the sensitivity of the capacitive fingerprint recognition mode, and avoids the fingerprint recognition error as the capacitive electrodes such as ITO can be difficult to be manufactured to be very small.

BRIEF DESCRIPTION OF THE DRAWINGS

Simple description will be given below to the accompanying drawings of the embodiments to provide a more clear understanding of the technical proposals of the embodiments of the present disclosure. Obviously, the drawings described below only involve some embodiments of the present disclosure but are not intended to limit the present disclosure.

Figure 1:
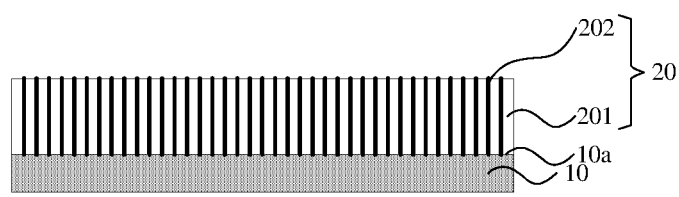
FIG. 1 is a schematic structural sectional view of an electrode structure provided by one embodiment of the present disclosure.

Reference numerals of the accompanying drawings:

01 electrode structure; 10 electrode body; 10a upper surface; 20 composite layer; 201 main body glue; 202 one-dimensional nano-conductor material; 02 finger.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

It should be noted that: unless otherwise specified, all the terms (including technical and scientific terms) used in the present disclosure have the same meaning commonly understood by those skilled in the art. It should be also understood that: unless otherwise specified, those terms defined in the usual dictionary shall be construed as the meanings consistent with their meanings in the context of relevant technologies and shall not be construed as idealized or extremely formalized meanings.

Moreover, the orientation or position relationships indicated by the terms such as "on" and "beneath" used in the Description and the Claims of the present disclosure are the orientation or position relationships as illustrated in the accompanying drawings, are only used for simple and convenient description of the present disclosure, and not intended to indicate or imply that the indicated device or element must have specified orientation and be constructed and operated in specific orientation, and hence cannot be construed as the limitation of the present disclosure.

It should be also understood by those skilled in the art that: as the dimension of the structures in the capacitive electrodes involved in the embodiment of the present disclosure is very small, for clarity, the dimension and the scale of the structures and the relative thickness of the electrodes, in the accompanying drawings of the present disclosure, are all enlarged and do not represent the actual size.

As illustrated in FIG. 1, at least one embodiment of the present disclosure provides an electrode structure 01 applied for fingerprint recognition. The electrode structure 01 comprises: an electrode body 10; and a composite layer 20 disposed on an upper surface 10a of the electrode body 10, wherein a surface of the composite layer 20 away from the electrode body 10 is set to be a finger contact surface in the case of fingerprint recognition; the composite layer 20 is formed by cured main body glue 201 and one-dimensional nano-conductor materials 202 distributed in the main body glue 201; and one end of each of the one-dimensional nano-conductor materials 202 is exposed from the finger contact surface of the main body glue 201, and the other end of each of the one-dimensional nano-conductor materials 202 makes contact with the electrode body 10.

In the electrode structure 01, the shape of the electrode body 10 is tabular such as rectangular or diamondoid. The size and the thickness of the electrode body may adopt those in the prior art. No further description will be given here.

When a fingerprint recognition module formed by a plurality of electrode structures 01 arranged in an array are disposed in a non-display region of a display device, for instance, a fingerprint touch key disposed below the screen of a smart mobile phone, conductive materials for forming the electrode body 10 may be formed by any one of transparent conductive materials, or metal or alloy with low light transmittance.

When the fingerprint recognition module formed by the plurality of electrode structures 01 arranged in an array is disposed in a display region of the display device, for instance, the display device can achieve full-screen fingerprint recognition and the electrode structures 01 are distributed on the entire display, in this case, in order to avoid the metal and alloy with low light transmittance from affecting the transmittance of the display device, the conductive materials for forming the electrode body 10 may be selected to be transparent conductive materials. The transparent conductive material, for instance, may be any one of ITO, indium zinc oxide (IZO), or fluorine-doped tin oxide (FTO).

One-dimensional nanomaterials are also referred to as linear nanomaterials, have ultrafine linear structures such as nano wires, nanobelts, nanotubes and nanorods, and are defined to be that the radial dimension is ranged from 1 nm to 100 nm and the axial dimension is ranged from nanometer to micrometer scale.

As for the nano wires, the radial dimension of the nano wire is the dimension of the nano wire, and the axial dimension is the length of the nano wire; as for the nanobelts, the radial dimension of the nano belt is the maximum section width, and the axial dimension is the length of the nanobelt; as for the nanotubes, the radial dimension of the nanotube is the section diameter of the nanotube (herein, as the thickness of the tube wall of the nanotube is very small, the section diameter may be the diameter of an inner tube of the nanotube and may also be the diameter of an outer tube of the nanotube), and the axial dimension is the length of the nanotube; and as for the nanorods, the radial dimension of the nanorod is the section diameter of the nanorod, and the axial dimension is the length of the nanorod.

In the one-dimensional nanomaterial, those with relatively low aspect ratio (namely the ratio of the axial dimension to the radial dimension) are referred to as nanorods, and those with high aspect ratio are referred to as nanowires, nanobelts and nanotubes. The value of the aspect ratio has no strict standard, and in general, those with the length (namely the axial dimension) of less than 1 μm are referred to as nanorods, and those with the length of greater than 1 μm are referred to as nanowires, nanobelts and nanotubes.

Therefore, in the electrode structure 01 provided by the embodiment of the present disclosure, the one-dimensional nano-conductor materials 202 distributed in the composite layer 20 are one-dimensional nanomaterials with electric conductivity, the structures of which may be nano wires, nanobelts, nanotubes, nanorods, etc.

The material of the one-dimensional nano-conductor material 202 may be any one of carbon, metal element, or alloy, wherein metallic elements for forming the metal element include: any one selected from the group consisted of gold, silver, copper, cobalt, nickel, zinc, iron, platinum, ruthenium, molybdenum, niobium, iridium, palladium, titanium, cadmium, tungsten, vanadium and bismuth; and metallic elements in the alloy include: at least one selected from the group consisted of gold, silver, copper, cobalt, nickel, zinc, iron, platinum, ruthenium, molybdenum, niobium, iridium, palladium, titanium, cadmium, tungsten, vanadium and bismuth.

For instance, carbon nanotubes (CNTs), silver nano wires, gold nano wires and the like with superior electric conductivity may be selected, in which CNT may be a single-wall and/or multi-wall structure. No limitation will be given here in the present disclosure.

As one end of the one-dimensional nano-conductor material 202 makes contact with the electrode body 10 and the other end is exposed to the finger contact surface of the main body glue 201, namely used for contacting the fingerprint, when a certain amount of electricity is introduced into the electrode body 10, the one-dimensional nano-conductor materials 202 and the electrode body 10 are electrically connected. Moreover, as the one-dimensional nano-conductor materials 202 are parallel to each other, the one-dimensional nano-conductor materials 202 making contact with the upper surface 10*a* of the electrode body 10 are equivalent to conductive fluffs which are perpendicular or inclined at a certain angle. When a finger 02 contacts one end of the one-dimensional nano-conductor material 202 exposed to the finger contact surface of the main body glue, as the axial dimension of the one-dimensional nano-conductor material 202 is very small, generally ranged from 1 nm to 100 nm, each one-dimensional nano-conductor material 202 is equivalent to one capacitive electrode with very small dimension and may accurately make contact with the ridge and valley structure on the surface of the finger, so that the accuracy and the sensitivity of capacitive fingerprint recognition can be improved.

Considering that the axial dimension of the one-dimensional nanomaterial is far greater than the radial dimension thereof, if an angle α between the axial direction of the one-dimensional nano-conductor material 202 and the upper surface 10*a* of the electrode body 10 is set to be too small, e.g., less than 70°, the one-dimensional nano-conductor material 202 tends to be bended, so that the effect of the conductive fluff cannot be achieved. Therefore, in the electrode structure 01, the axial dimension of the one-dimensional nano-conductor material 202 is set to be at an angle with the upper surface 10*a* of the electrode body 10, and the included angle is ranged from 70° to 90°.

Figure 2:
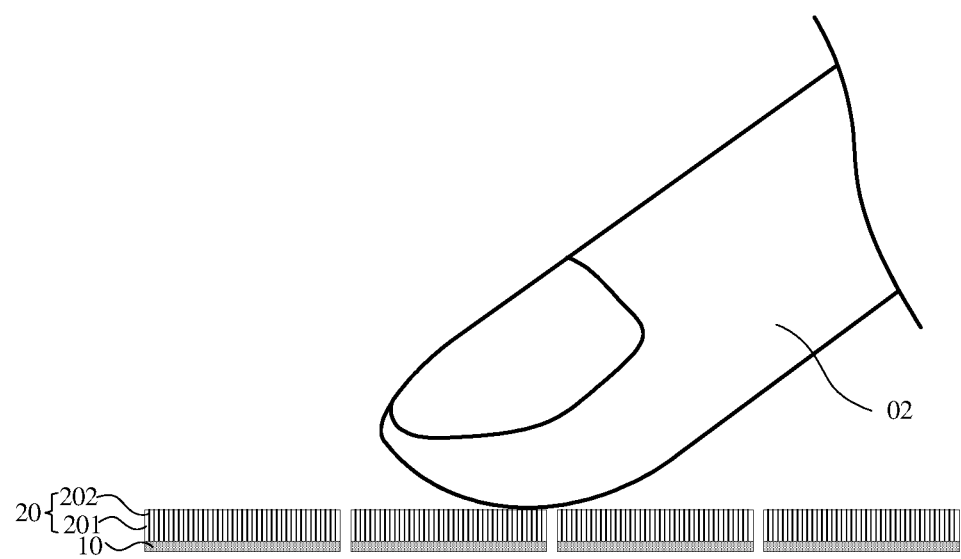
FIG. 2 is a schematic structural sectional view of a fingerprint recognition module provided by one embodiment of the present disclosure.

Description is given in the text by taking the case that the included angle in FIGS. 1 and 2 is 90°, namely the one-dimensional nano-conductor material 202 is perpendicular to the upper surface 10*a* of the electrode body 10, as an example.

Moreover, the one-dimensional nano-conductor materials 202 are parallel to each other, for instance, may be perpendicular to the upper surface 10*a* of the electrode body 10 and may also be arranged relative to the upper surface 10*a* of the electrode body 10 at a certain included angle. No limitation will be given here in the present disclosure.

As the one-dimensional nano-conductor materials 202 cannot be independently distributed on the upper surface 10*a* of the electrode body 10, the one-dimensional nano-conductor materials 202 must be distributed in the main body glue 201 in advance, and subsequently, the main body glue 201 distributed with the one-dimensional nano-conductor materials 202 is disposed on the upper surface 10*a* of the electrode body 10. Thus, the axial direction of the one-dimensional nano-conductor materials 202 can be perpendicular to the upper surface 10*a* of the electrode body 10 or inclined relative to the upper surface 10*a* of the electrode body 10.

The main body glue 201 may be ultraviolet (UV) curing adhesive or heat curing adhesive, namely the electrode structure 10 with stable structure is formed by fixing the main body glue 201 distributed with the one-dimensional nano-conductor materials 202 on the upper surface 10*a* of the electrode body 10 by UV or heating.

For instance, when the main body glue 201 is UV curing adhesive, the composition thereof may be acrylic resin, epoxy resin or the like in which photo initiator is scattered.

In the embodiment of the present disclosure, the thickness of the composite layer 20 in the electrode structure 01 is not limited. But when the thickness of the composite layer 20 is too small, the axial dimension of the one-dimensional nano-conductor material 202 is small, which is not conducive to the electrical signal transmission of the one-dimensional nano-conductor materials 202; and if the thickness of the composite layer 20 is too large, the axial dimension of the one-dimensional nano-conductor materials 202 is large, so the phenomenon of bending or the like tends to occur, which is not conducive to the thin-and-light development of the capacitive fingerprint recognition module. For instance, in one embodiment of the present disclosure, the thickness of the composite layer 20 is ranged from 20 μm to 200 μm.

By adoption of the electrode structure 01 provided by the embodiment of the present disclosure, as one end of the one-dimensional nano-conductor material 202 makes contact with the electrode body 10 and the other end is exposed to the finger contact surface of the main body glue 201, when a certain amount of electricity is introduced into the electrode body 10, the one-dimensional nano-conductor material 202 and the electrode body 10 are electrically connected. Moreover, as the one-dimensional nano-conductor materials 202 are parallel to each other, each one-dimensional nano-conductor material 202 distributed on the upper surface 10a of the electrode body 10 is equivalent to one conductive fluff and may accurately make contact with the ridge and valley structure on the surface of the finger. As the radial dimension of the one-dimensional nano-conductor material 202 making contact with the ridge and valleys is far less than the dimension of the capacitive electrode such as ITO, the embodiment obviously improves the accuracy and the sensitivity of the capacitive fingerprint recognition mode, and avoids the fingerprint recognition error as the capacitive electrodes such as ITO can be difficult to be manufactured to be very small.

Moreover, at least one embodiment of the present disclosure further provides a fingerprint recognition module as illustrated in FIG. 2, which comprises a plurality of foregoing electrode structures 01.

Figure 3:
FIG. 3 is a schematic structural sectional view of a fingerprint recognition module provided by another embodiment of the present disclosure.

On this basis, in order to simplify the manufacturing process of the electrode structure 01, as illustrated in FIG. 3, in the plurality of foregoing electrode structures 01 of the fingerprint recognition module, the electrode bodies 10 are spaced from each other, and the composite layers 20 may have an integrated structure.

It should be noted that the description that the composite layer 20 has the integrated structure indicates that the composite layer 20 disposed on the upper surface 10a of each electrode body 10 is connected with each other to form an entire layer of structure by materials the same with those of the composite layer 20. When the composite layers 20 have the integrated structure, the other end of the one-dimensional nano-conductor material 202 on the upper surface 10a of the electrode body 10 of each electrode structure 01, exposed to the finger contact surface of the main body glue 201, is not overlapped with the upper surface 10a of the electrode body 10 of another adjacent electrode structure 01, namely a projection of the other end on the electrode body 10 falls within the upper surface 10a of the electrode body 10 and does not fall within the upper surface 10a of the electrode body 10 of another adjacent electrode structure 01, so that test error can be avoided.

The fingerprint recognition module may further comprise: structural units (not illustrated in FIG. 2) such as an image storage unit configured to prestore fingerprints of a testee, an image generation unit configured to generate a fingerprint image according to the sensing capacitance, an image reading unit configured to read the generated fingerprint image, and an image comparison unit configured to compare whether the read fingerprint image is consistent with the prestored fingerprint images.

Figure 4:
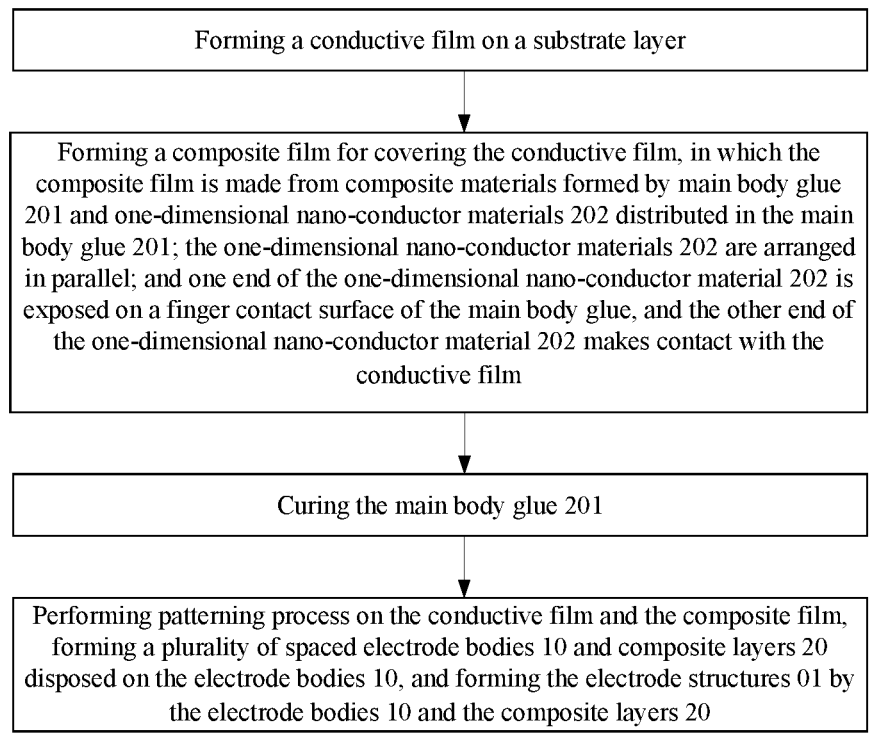
FIG. 4 is a flow diagram of a manufacturing process of an electrode structure, provided by one embodiment of the present disclosure.

Moreover, at least one embodiment of the present disclosure further provides a method for manufacturing the fingerprint recognition module, which comprises: forming a plurality of electrode structures 01. As illustrated in FIG. 4, forming the plurality of electrode structures 01 includes:

forming a conductive film on a substrate layer;

forming a composite film for covering the conductive film, in which the composite film is made from composite materials formed by main body glue and one-dimensional nano-conductor materials 202 distributed in the main body glue 201;

curing the main body glue 201; and performing patterning process on the conductive film and the composite film, forming a plurality of spaced electrode bodies 10 and composite layers 20 disposed on upper surfaces 10a of the electrode bodies 10, and forming the electrode structures 01 by the electrode bodies 10 and the composite layers 20.

The conductive film may be made from transparent conductive materials such as ITO, IZO and FTO, so as to form the subsequent electrode bodies 10.

The composite film is made from the composite materials formed by the main body glue 201 and the one-dimensional nano-conductor materials 202 distributed in the main body glue 201; the one-dimensional nano-conductor materials 202 are arranged in parallel; and one end of the one-dimensional nano-conductor material 202 is exposed on one surface of the main body glue 201 away from the conductive film, and the other end of the one-dimensional nano-conductor material 202 makes contact with the conductive film.

Herein, the composite film may be formed by a plurality of means:

For instance, taking the case that the one-dimensional nano-conductor material 202 is formed by a carbon nanotube, vertically arranged carbon nanotubes may be formed on a surface of the conductive film by electrostatic spinning or the like, and subsequently, the main body glue 201 is coated, so that the other ends of the carbon nanotubes not making contact with the conductive film can be exposed to the surface of the main body glue 201 away from the conductive film.

Or the manufactured carbon nanotubes may also be longitudinally distributed in UV curing adhesive; transverse ends of the carbon nanotubes coated with the UV curing adhesive is bonded to the surface of the conductive film, so that one ends of the carbon nanotubes can make contact with the conductive film; subsequently, the UV curing adhesive distributed with the carbon nanotubes is cut along the radial direction of the carbon nanotubes, so that the UV curing adhesive can form one thin layer; and hence the composite film for covering the conductive film can be obtained.

The manufacturing method of the carbon nanotubes may adopt a plurality of methods such as arc discharge method, laser ablation method, chemical vapor deposition (CVD) method (hydrocarbon gas pyrolysis method), solid phase pyrolysis method, glow discharge method, gas combustion method and polymerization reaction method. No further description will be given here.

Or the pattern transfer method may be adopted, namely the main body glue 201 distributed with the carbon nanotubes may be formed on a substrate at first, and subsequently, transferred to the conductive film by pattern transfer method.

In the present disclosure, the main body glue 201 in the composite film coated on the surface of the conductive film may be cured by UV irradiation.

The conductive film and the composite film are subjected to patterning process to form a plurality of spaced electrode bodies 10 and composite layers 20 disposed on upper surfaces 10a of the electrode bodies 10; and the electrode structures 01 are formed by the electrode bodies 10 and the composite layers 20. That is to say, the conductive film and the composite film are subjected to patterning process together to form the patterned electrode bodies 10 and the patterned composite layers 20, so as to form a plurality of spaced electrode structures 01.

In the present disclosure, the conventional patterning process refers to the processes of photoresist exposure, development, etching and photoresist removal via one mask.

Figure 5:
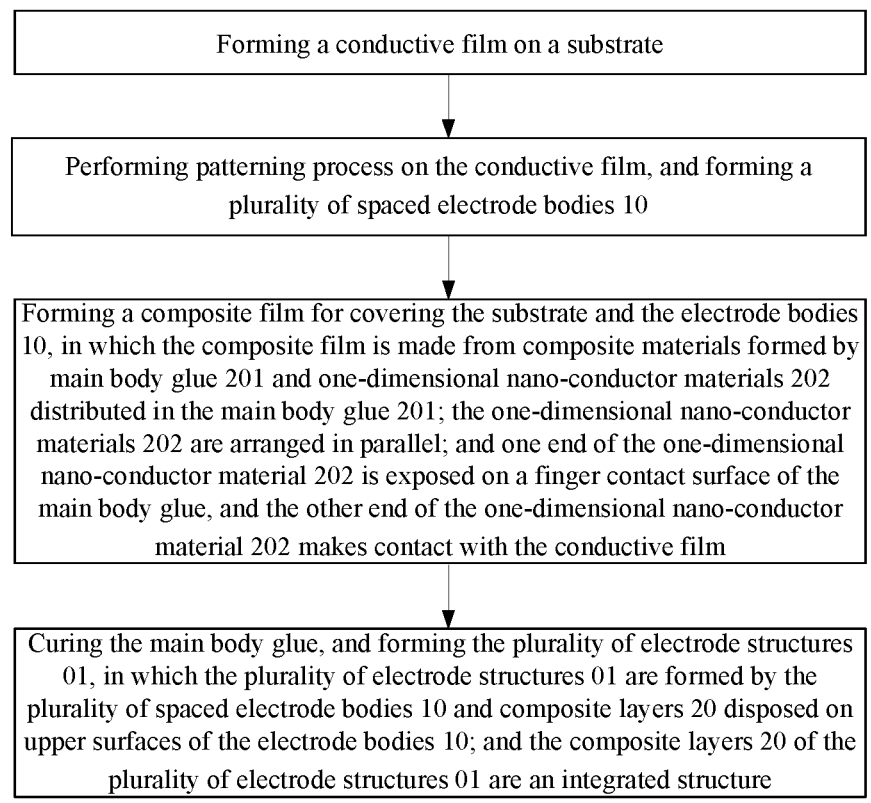
FIG. 5 is a flow diagram of a manufacturing process of an electrode structure, provided by another embodiment of the present disclosure.

Moreover, at least one embodiment of the present disclosure further provides another method for manufacturing the fingerprint recognition module, which comprises: forming a plurality of foregoing electrode structures 01. As illustrated in FIG. 5, forming the plurality of foregoing electrode structures 01 includes:

forming a conductive film on a substrate;

performing patterning process on the conductive film, and forming a plurality of spaced electrode bodies 10;

forming a composite film for covering the substrate and the electrode bodies 10; and curing main body glue, and forming the plurality of electrode structures 01.

The conductive film may be made from transparent conductive materials such as ITO, IZO and FTO, so as to form the subsequent electrode bodies 10.

The conductive film is subjected to patterning process to form the plurality of spaced electrode bodies 10. Herein, the typical patterning process refers to processes of photoresist exposure, development, etching and photoresist removal via one mask.

The composite film for covering the substrate and the electrode bodies 10 formed on the substrate is formed by the main body glue 201 and one-dimensional nano-conductor materials 202 distributed in the main body glue 201; the one-dimensional nano-conductor materials 202 are arranged in parallel; and one end of the one-dimensional nano-conductor material 202 is exposed to a surface of the main body glue 201 away from the electrode body 10, and the other end of the one-dimensional nano-conductor material 202 makes contact with the conductive film.

The main body glue is cured to form the plurality of electrode structures 01; the plurality of electrode structures 01 are formed by the plurality of spaced electrode bodies 10 and composite layers 20 disposed on upper surfaces of the electrode bodies 10; and the composite layers 20 of the plurality of electrode structures 01 are an integrated structure.

It should be noted that: as the electrode bodies 10 are arranged with interval, a part of the composite film covering the upper surface 10a of the electrode body 10 is the composite layer 20 of each electrode structure 01; and as the composite film is not subjected to patterning process and is an entire layer of integrated structure, the composite layers 20 disposed on the upper surfaces 10a of the electrode bodies 10 arranged with interval are an integrated structure, namely the composite film obtained after the curing of the main body glue 201.

In the present disclosure, as the composite film integrally covers the upper surfaces 10a of the alternately arranged electrode bodies 10, as for the plurality of electrode structures 01, the description that the composite layers 20 are an integrated structure refers to that the composite layers 20 disposed on the upper surfaces 10a of the electrode bodies 10 are connected with each other to form an entire layer of structure by materials the same with those of the composite layer 20. When the composite layers 20 are an integrated structure, the other end of the one-dimensional nano-conductor material 202 on the upper surface 10a of the electrode body of each electrode structure 01, exposed by the main body glue 201, is not overlapped with the upper surface 10a of the electrode body 10 of another adjacent electrode structure 01, so that test error can be avoided.

On this basis, at least one embodiment of the present disclosure further provides a display device, which comprises the foregoing fingerprint recognition module.

The display device may be any product or component with display function such as a liquid crystal display (LCD) panel, an LCD, an LCD TV, an organic light-emitting diode (OLED) display panel, an OLED display, an OLED TV, e-paper, a digital picture frame, a mobile phone and a tablet PC.

When the display device is specifically a smart mobile phone or a tablet PC, the accuracy of user fingerprint recognition can be further improved, and the step of additionally inputting passwords in the case that the fingerprint of the user cannot be recognized can be avoided.

It should be noted that all the accompanying drawings of the present disclosure are brief schematic diagrams of the electrode structure, are only intended to clearly describe the structures relevant to the invention points embodied in the proposal, and other structures irrelevant to the invention points are the conventional structures and are not embodied in the accompanying drawings or only parts are embodied.

The foregoing is only the preferred embodiments of the present disclosure and not intended to limit the scope of protection of the present disclosure. The scope of protection of the present disclosure is defined by the appended claims.

The application claims priority to the Chinese patent application No. 201510719692.X, filed Oct. 29, 2015, the disclosure of which is incorporated herein by reference as part of the application.

The invention claimed is:

1. An electrode structure, comprising: an electrode body, a composite layer disposed on the electrode body; a surface of the composite layer away from the electrode body being set to be a finger contact surface in a case of fingerprint recognition, wherein the composite layer is made from composite materials formed by a cured main body glue and one-dimensional nano-conductor materials distributed in the main body glue;

an end of each of the one-dimensional nano-conductor materials is exposed from the finger contact surface of the composite layer, and the other end of each of the one-dimensional nano-conductor materials makes contact with the electrode body; and the axial direction of each of the one-dimensional nano-conductor materials is inclined relative to an upper surface of the electrode body, the axial direction of each of the one-dimensional nano-conductor materials is at an angle with the upper surface of the electrode body, and the angle is greater than 70° and less than 90°.

2. The electrode structure according to claim 1, wherein the one-dimensional nano-conductor materials have a structure including at least one of nano wire, nanobelt, nanotube, or nanorod.

3. The electrode structure according to claim 1, wherein the one-dimensional nano-conductor materials include any one of carbon, elemental metal, or alloy;

metallic elements for forming the elemental metal element include: any one selected from the group consisted of gold, silver, copper, cobalt, nickel, zinc, iron, platinum, ruthenium, molybdenum, niobium, iridium, palladium, titanium, cadmium, tungsten, vanadium, and bismuth; and metallic elements in the alloy include: at least one selected from gold, silver, copper, cobalt, nickel, zinc, iron, platinum, ruthenium, molybdenum, niobium, iridium, palladium, titanium, cadmium, tungsten, vanadium, and bismuth.

4. The electrode structure according to claim 3, wherein the one-dimensional nano-conductor materials are carbon nanotubes.

5. The electrode structure according to claim 1, wherein the main body glue is ultraviolet (UV) curing adhesive or heat curing adhesive.

6. The electrode structure according to claim 1, wherein the electrode body is made from any material of transparent conductive material, metal, or alloy.

7. The electrode structure according to claim 1, wherein the one-dimensional nano-conductor materials are arranged in parallel.

8. The electrode structure according to claim 1, wherein a thickness of the composite layer is ranged from 20 μm to 200 μm.

9. A fingerprint recognition module, comprising the electrode structure according to claim 1.

10. A fingerprint recognition module comprising an electrode structure, the electrode structure comprising an electrode body, and a composite layer disposed on the electrode body, a surface of the composite layer away from the electrode body being set to be a finger contact surface in a case of fingerprint recognition, wherein the composite layer is made from composite materials formed by a cured main body glue and one-dimensional nano-conductor materials distributed in the main body glue, wherein an end of each of the one-dimensional nano-conductor materials is exposed from the finger contact surface of the composite layer, and the other end of each of the one-dimensional nano-conductor materials makes contact with the electrode body, and wherein the electrode bodies of a plurality of electrode structures are arranged with interval, and the composite layers of the plurality of electrode structures have an integrated structure.

11. The A fingerprint recognition module comprising an electrode structure, the electrode structure comprising an electrode body, and a composite layer disposed on the electrode body, a surface of the composite layer away from the electrode body being set to be a finger contact surface in a case of fingerprint recognition, wherein the composite layer is made from composite materials formed by a cured main body glue and one-dimensional nano-conductor materials distributed in the main body glue, wherein an end of each of the one-dimensional nano-conductor materials is exposed from the finger contact surface of the composite layer, and the other end of each of the one-dimensional nano-conductor materials makes contact with the electrode body, and wherein a plurality of electrode structures are arranged with interval.

12. A method for manufacturing the fingerprint recognition module according to claim 10, comprising:

forming a conductive film on a substrate;

forming a composite film for covering the conductive film, in which the composite film is made from composite materials formed by a main body glue and one-dimensional nano-conductor materials distributed in the main body glue; the one-dimensional nano-conductor materials are arranged in parallel; one end of each of the one-dimensional nano-conductor materials is exposed on a finger contact surface of the main body glue, and the other end of each of the one-dimensional nano-conductor materials makes contact with the conductive film;

curing the main body glue; and performing patterning process on the conductive film and the composite film, forming a plurality of spaced electrode bodies and composite layers disposed on upper surfaces of the electrode bodies, and forming the electrode structures by the electrode bodies and the composite layers.

13. A method for manufacturing the fingerprint recognition module according to claim 10, comprising:

forming a conductive film on a substrate;

performing patterning process on the conductive film, and forming a plurality of spaced electrode bodies;

forming a composite film for covering the substrate and the electrode bodies, in which the composite film is made from composite materials formed by main body glue and one-dimensional nano-conductor materials distributed in the main body glue; the one-dimensional nano-conductor materials are arranged in parallel; one end of each of the one-dimensional nano-conductor materials is exposed on a finger contact surface of the main body glue, and the other end of each of the one-dimensional nano-conductor materials makes contact with the conductive film; and curing the main body glue, and forming the plurality of electrode structures, in which the plurality of electrode structures are formed by the plurality of spaced electrode bodies and the composite film disposed on upper surfaces of the electrode bodies, and the composite film is an integrated structure.

14. A display device, comprising the fingerprint recognition module according to claim 9.

15. A display device, comprising the fingerprint recognition module according to claim 10.

16. A display device, comprising the fingerprint recognition module according to claim 11.

* * * * *